350-269.
12-31-74 XR 3,858,004
SR

United States Patent [19]

Mason et al.

[11] 3,858,004

[45] Dec. 31, 1974

[54] FILTER FOR SELECTIVE SPEED XEROGRAPHIC PRINTING IN FACSIMILE TRANSCEIVERS AND THE LIKE

[75] Inventors: Peter J. Mason, Ontario; David R. Shuey, Webster, both of N.Y.

[73] Assignee: Xerox Corporation, Stamford, Conn.

[22] Filed: May 17, 1973

[21] Appl. No.: 361,386

[52] U.S. Cl. ............ 178/7.6, 178/DIG. 27, 350/269
[51] Int. Cl. ............ H04n 1/30, G02f 1/30
[58] Field of Search .................. 178/7.6, 6, DIG. 27; 350/266, 273, 269; 346/76 L, 74 ES

[56] References Cited

UNITED STATES PATENTS

| | | | |
|---|---|---|---|
| 3,195,405 | 7/1965 | Clark et al. | 350/273 |
| 3,316,348 | 4/1967 | Hufnagel et al. | 178/7.6 |
| 3,750,189 | 7/1973 | Fleischer | 346/74 ES |

*Primary Examiner*—Howard W. Britton
*Assistant Examiner*—Michael A. Masinick

[57] ABSTRACT

An adjustable attenuator is included in a facsimile transceiver in the optical path for the collimated light beam emitted by a laser so that the same laser may alternatively be used for laser scanning and selective speed xerographic laser printing, without altering the effective scanning or printing apertures.

2 Claims, 5 Drawing Figures

FILTER FOR SELECTIVE SPEED XEROGRAPHIC PRINTING IN FACSIMILE TRANSCEIVERS AND THE LIKE

BACKGROUND OF THE INVENTION

This invention relates, generally, to selective speed xerography and, more particularly, to selective speed xerographic, laser printing for facsimile.

In the years since it was first found that the intensity of the collimated light beam characteristically emitted by the laser can be modulated, substantial time and effort has been devoted to applying lasers to various types of printing. Among the printing technologies to which the intensity modulated laser has been applied is the well known art of xerographic printing. As is known, in transfer xerography, for example, a photoreceptor is exposed to light in an imagewise configuration to form a latent electrostatic image. Thereafter, the latent image is developed by the application of toner and then transferred to and bonded on ordinary paper or some other suitable recording medium.

Conventional xerography, such as is used in commercially available copiers and duplicators, normally involves full frame or partial frame (e.g., line-by-line) exposure of the photoreceptor. In contrast, the intensity modulated laser lends itself to point-by-point exposure of the photoreceptor. The distinction between frame and point-by-point exposure is an important one. In facsimile systems, for example, the information content of the subject copy is serially converted into a video signal at a transmitting terminal. The video signal (or, more commonly, a carrier modulated in accordance therewith) is then transmitted through a communications link to a receiving terminal. At the receiving terminal, a more or less exact copy or "facsimile" of the subject copy is provided by a printer in response to the video signal. As a general rule, the video signal is a point-by-point representation of the information content of the subject copy. Thus, it is at least convenient to employ a point-by-point printer.

Underlying the general suitability of the intensity modulated laser to point-by-point xerographic printing is the availability of techniques for carrying out raster-like scanning of a photoreceptor with the light beam emitted by such a laser. Even more, however, is necessary to realize the full potential of such a printing process in the facsimile art. Specifically, in the facsimile art, the prevailing practice is to utilize transmitting and receiving equipment, or transceiving equipment, which is selectively operable at any one of several different transmission rates so that the user may select the most desirable of the available rates for his particular purposes. For instance, the 400 Telecopier facsimile transceiver manufactured and sold by Xerox Corporation is selectively operate at 6 and 4 minute transmission rates for standard 8 ½ inches by 100 inch documents to provide resolutions of 96 lines/inch vertically by 96 lines/inch horizontally and 64 lines/inch vertically by 96 lines/inch horizontally, respectively while using a voice grade telephone line tyep communications link.

SUMMARY OF THE INVENTION

One of the primary objects of the present invention is to provide methods and means for carrying out selective speed xerography printing with an intensity modulated laser.

More particularly, an important object of this invention is to provide methods and means for selective speed xerographic printing in facsimile transceivers and receivers. A more detailed, related object is to provide methods and means for selective speed xerographic printing in facsimile transceivers that are characterized by having a single laser alternatively used for scanning of subject copy and printing of facsimile copy while effectively maintaining predetermined substantially identical scanning and printing apertures.

In keeping with this invention it has been recognized that an adjustable attenuator may be used to match the power level of the collimated light beam emitted by the laser to the diverse requirements of laser scanning and selective speed xerographic laser printing, without altering the effective scanning or printing apertures. Thus, in the illustrated embodiment, there are a plurality of filtering elements of varying density, together with means for selectively positioning an appropriate one of the filtering elements in the optical path for the light beam.

BRIEF DESCRIPTION OF THE INVENTION

Still further objects and advantages of this invention will become apparent when the following detailed description in read in conjunction with the attached drawings, in which.

DETAILED DESCRIPTION OF THE ILLUSTRATED EMBODIMENT

While the invention is described in some detail hereinafter with reference to a single illustrated embodiment, it will be understood that there is no intent to limit it to that embodiment. On the contrary, the intent is to cover all modifications, alternatives and equivalents falling within the spirit and scope of the invention as defined by the appended claims.

Figure 1:
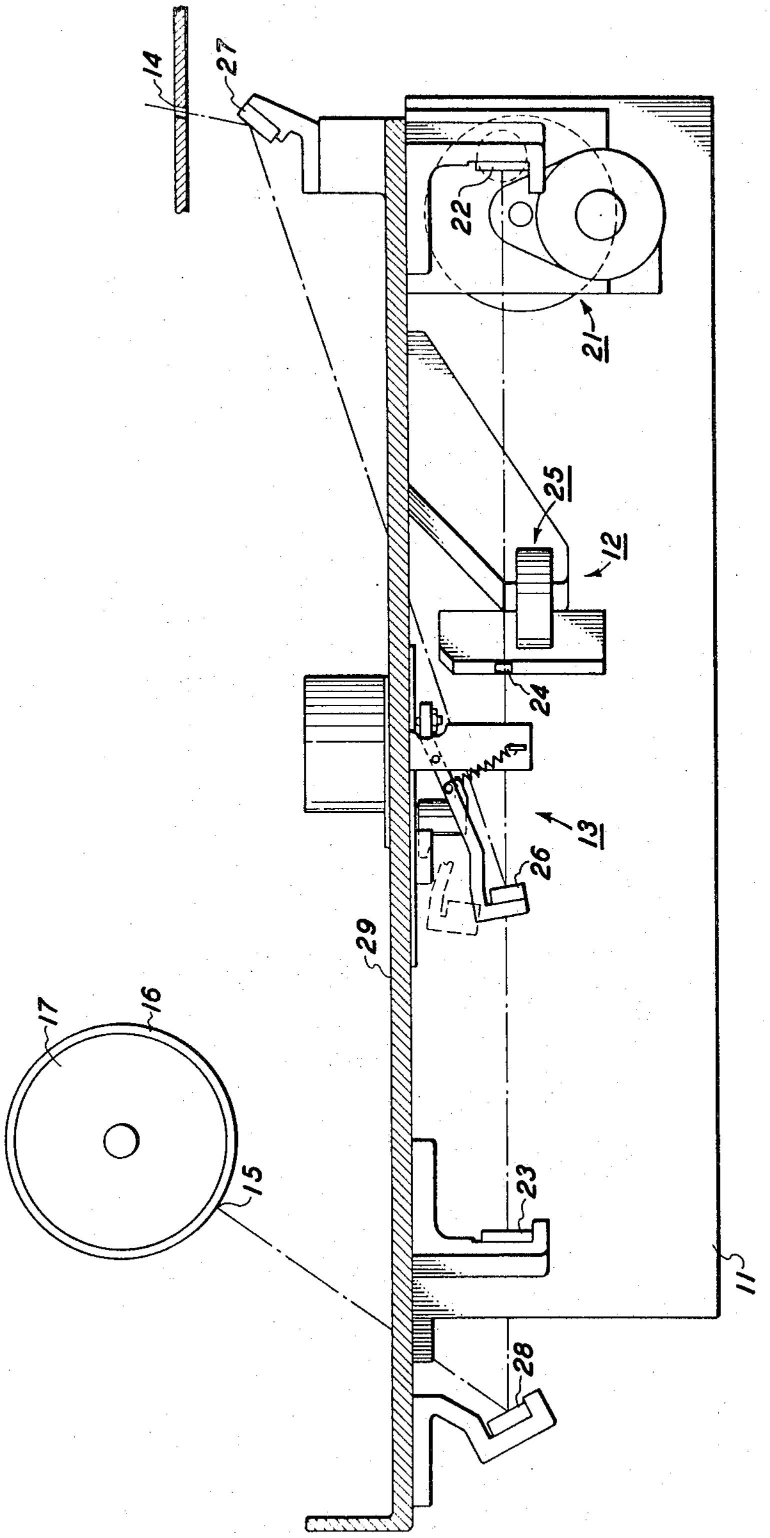
FIG. 1 is a simplified elevational view of the optical system for a facsimile transceiver having a filtering mechanism constructed in accordance with the present invention.
Figure 2:
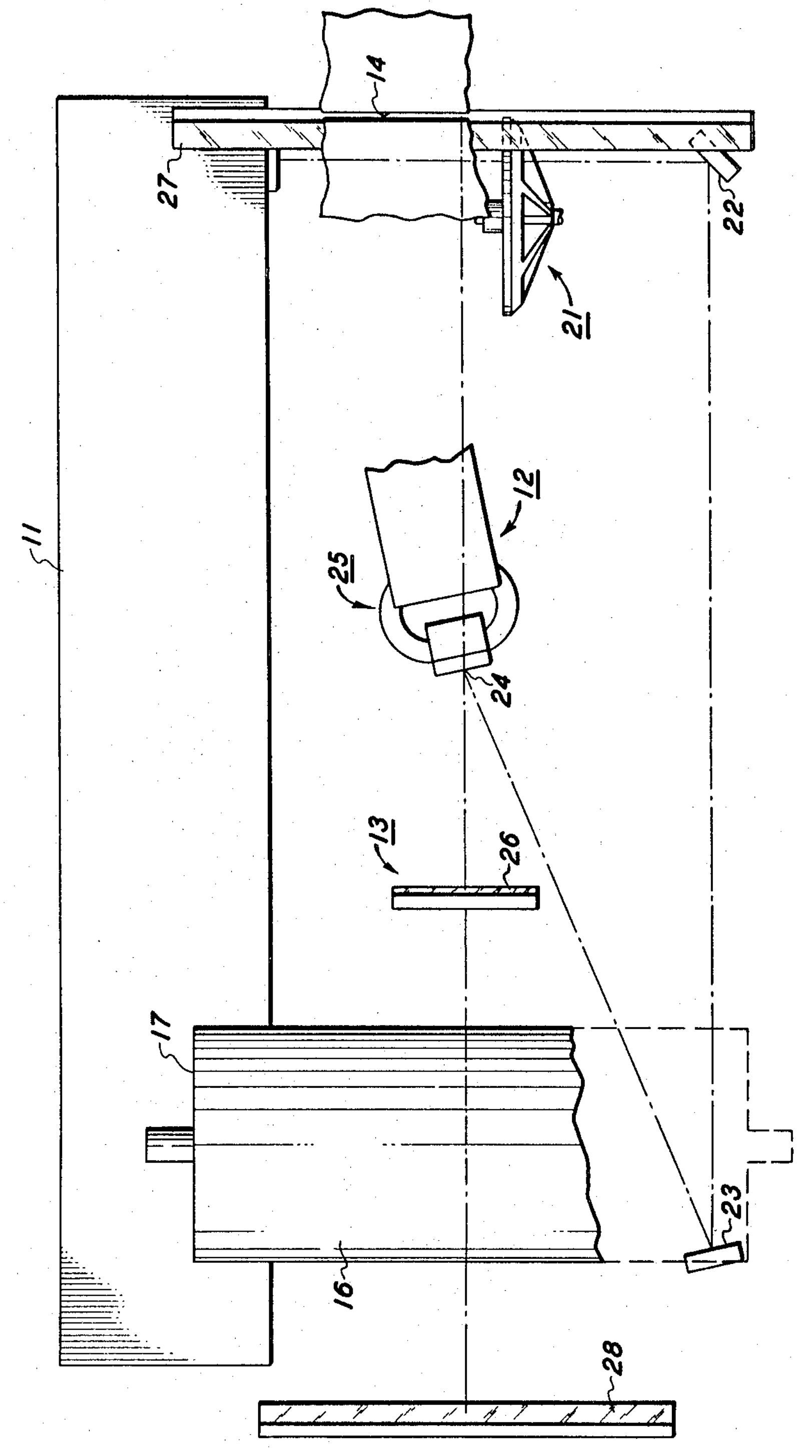
FIG. 2 is a simplified plan view of the transceiver shown in FIG. 1.

Turning now to the drawings, and at this point especially to FIGS. 1 and 2, it will be seen that the facsimile transceiver there shown relies on laser scanning when operating in its transmitting mode and on xerographic laser printing when operating in its receiving mode. To that end, the transceiver includes a laser 11 for supplying a coherent and substantially collimated beam of light, a deflecting mechanism 12 for cyclically sweeping the light beam through a predetermined scan angle, and a flip mirror assembly 13 for selectively directing the cyclically sweeping light beam toward a line-like scanning station 14 or a line-like printing station 15 via respective optical paths of substantially equal length.

In many instances, it is also desirable to include a lens (not shown) between the laser 11 and the deflecting mechanism 12 for convergently focusing the beam while modifying its cross-section configuration. For example, an anamorphic lens has been employed in experimental models of the transceiver shown to provide an elliptical scanning/printing spot having a major axis of approximately 0.020 inches and a minor axis of approximately 0.010 inches focused so that the locus of the focus is equidistant from the ends and the center of the scanning station when the transceiver is in its transmitting mode and of the printing station when the transceiver is in its printing mode. As will be appreciated, the size of the scanning spot defines the effective scanning aperture, while the size of the printing spot defines the effective printing aperture.

Scanning involves the projection of a substantially constant intensity spot of cyclically sweeping light onto the information bearing surface of a subject copy (not shown) as the subject copy is incrementally advanced (by means not shown) in the plane of and perpendicularly to the scanning station 14 so that a scanning raster is traced on the subject copy. Printing, on the other hand, involves the projection of the modulated intensity spot of cyclically sweeping light onto the surface of a xerographic photoreceptor 16 as the photoreceptor is incrementally advanced (by means not shown) in the plane of and perpendicular to the printing station 15 so that a printing raster is traced on the photoreceptor. As shown, the photoreceptor 16 is a surface coating on a drum 17 suitable for transfer xerography. The drum is incrementally rotated (by means not shown) about an axis which is offset from the printing station 15 by a distance substantially equal to the drum radius, with the result the printing station 15 is in a plane tangent to the photoreceptor 16.

Various modifications may, of course, be made to the illustrated optical system, without departing from this invention. As shown, the collimated light beam emitted by the lasser 11 passes through a filtering mechanism 21 constructed in accordance with the present invention and then bounces off successive fixed mirrors 22 and 23 while in route to the deflecting mechanism 12. The deflecting mechanism 12 comprises a flat mirror 24 which is periodically oscillated through the desired scanning angle by a galvanometer-type driver 25, and the flip mirror assembly includes an elongated mirror 26 which is movable between an upper position (phantom lines) and a lower position (solid lines) to selectively direct the cyclically sweeping light beam to the scanning station 14 via a fixed elongated mirror 27 or to the printing station 15 via another fixed elongated mirror 28. Suitably, the laser 11, the deflecting mechanism 12, the flip mirror assembly 13, the filtering mechanism 21, and the mirrors 22, 23, 27 and 28 are all secured to and supported by a main frame member 29.

The primary function of the filtering mechanism 21 is to permit the xerographic printing to be carried out at anyone of several different rates, without materially altering the size of the effective printing aperture or significantly affecting the xerographic quality of the printed copies. Changes in the printing rate are necessarily accompanied by variations in the amount of exposure time/unit area of the photoreceptor, regardless of whether such rate changes are carried out by changing the rate at which the drum 17 is rotated or otherwise. Unfortunately, the xerographic process is exposure time sensitive inasmuch as the shading of a xerographically produced image varies as a direct function of exposure time/unit area when all the other parameters are held constant. In keeping with the present invention, however, the problems inherent in selective speed xerographic printing are overcome in a simple and highly reliable way by the filtering mechanism 21. Specifically, when the transceiver is operating in its receive mode, the filtering mechanism 21 adjustably attenuates the light beam emitted by the laser 11 to maintain the power of the light beam/unit area of the photoreceptor 16 within a predetermined range, regardless of the particular printing rate selected. Thus, the exposure of the photoreceptor 16 is maintained within a range which may be preselected to optimize the printing of black areas, white areas, and half tone or grey areas.

A secondary, but also important, function of the filtering mechanism 21 is to provide efficient utilization of the available light when the transceiver is operating in its transmit mode. To accomplish that, the filtering mechanism 21 is also capable of passing the light beam emitted by the laser 11 without significantly attenuating it.

Figure 3:
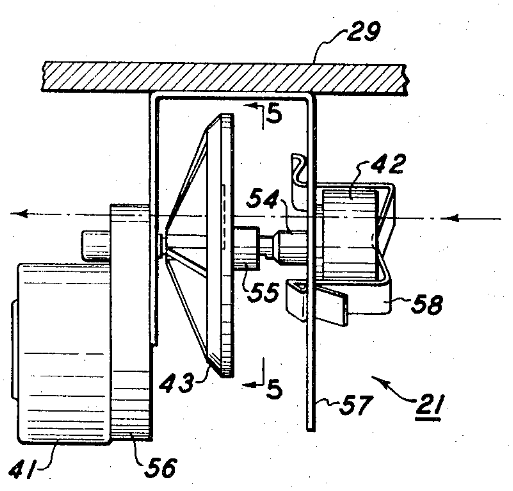
FIG. 3 is an enlarged elevational view of the filtering mechanism.
Figure 4:
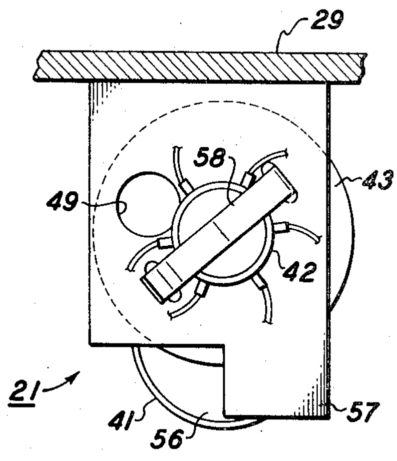
FIG. 4 is a right-hand end view of the filtering mechanism.
Figure 5:
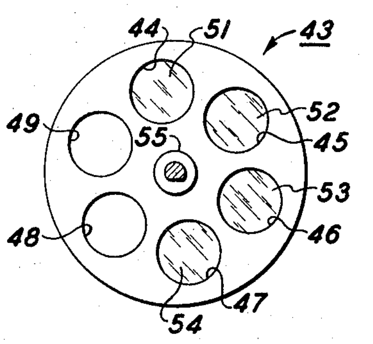
FIG. 5 is a view taken along the line 5—5 in FIG. 3 to better illustrate the filter wheel.

More particularly, as best shown in FIGS. 3–5, the illustrated filtering mechanism 21 comprises a motor 41 and a multi-position rotary switch 42 for selectively indexing a rotatable disc 43 to position any one of several apertures 44–49 in alignment with the optical path for the light beam emitted by the laser 11. The apertures 44–49 are spaced at regular angular intervals about the circumference of the disc 43 and at a predetermined radial distance from its axis of rotation, and seated within a number of the apertures, say, the first four 44–47, there are separate filtering elements 51–53, respectively, of different optical densities to provide the attenuation for any one of four different printing rates. The other apertures 48 and 49 are empty so that the beam emitted by the laser 11 may be transmitted through either one of them without suffering any significant attenuation, thereby ensuring efficient utilization of the available light when the transceiver is operating in its transmitting mode.

In practice only one of the last two apertures 48 and 49 is used. The other serves no practical purpose, other than to better balance the disc 43 as configured for use with commercially available six position rotary switches. As is known, such a switch has separate contacts spaced at 60° intervals about the circular path this is traced by a wiper contact (not shown) as the switch rotor 54 is rotated. The disc 41 has a corresponding number of apertures 44–49 spaced at the same angular intervals. Thus, there is a separate switch position for each of the apertures 44–49, with the result that any one of the apertures 44–49 may be indexed into optical alignment with the beam emitted by the laser 11 simply by selectively de-energizing the motor 41 when the wiper contact engages the particular contact corresponding to the selected aperture.

Considering the filter mechanism 21 in additional detail, it will be seen that the disc 43 is mounted on an elongated hub 55 which, in turn, is coupled at one end to the motor 41 via suitable speed reduction gearing 56 and at its other end to the rotor 54 of the rotary switch 42. Preferably, a D-type coupling or the like is used between the hub 55 and the switch rotor 54 so that there is a predetermined correlation between the angular orientations of the disc 41 and the switch rotor 54. As illustrated, the motor 41 and the speed reduction gearing 56 are supported by one arm of a generally U-shaped bracket 57, while the rotary switch 42 is secured to the other arm of the bracket 57 by a spring clip 58. The spring clip 58 protects the motor 41, the rotary switch 42 and the speed reduction gearing 56 by flexing to absorb the compressive forces that might otherwise result from the face-to-face coupling of the motor 41 and the rotary switch 42 to opposite ends of the hub 55.

The assembly of the filtering mechanism 21 is completed by attaching the bracket 57 to the main frame member 29 with the axis of rotation of the disc 43 offset from the optical path for the light beam emitted by the laser 11 by a distance substantially equal to the radial offset of the apertures 44–49 from the axis. Desirably, of course, the area of each of the apertures 44–49 is large relative to the cross-sectional area of the light beam supplied by the laser 11 to accomodate normal manufacturing tolerances in the radial and angular spacing of the apertures 44–49, the angular spacing between the successive positions of the rotary switch 42, and the offset between the axis of rotation of the disc 43 and the optical path for the light beam emitted by the laser 11.

An an example, it is perhaps noteworthy that it has been experimentally demonstrated that xerographic printing may be carried out at two, three, 4 and 6 minute transmission rates per 8 ½ inch by 11 inch document in response to the output of an intensity modulated laser rated to supply a light beam at a power level between 57 and 14 microwatts by attenuating the light beam with filters having transmissivities of 7.14 percent, 3.63 percent, 2.27 percent and 1.72 percent, respectively.

CONCLUSION

In view of the foregoing, it will be now understood that a method and means for selective speed xerographic laser printing has been provided. The effective printing aperture is substantially constant regardless of the particular printing speed selected, and the provision made for selective speed printing does not interfere with the efficient utilization of the laser for scanning. Consequently, it will be understood that the present invention is especially applicable to facsimile transceivers inasmuch as one laser may alternatively be used for scanning and selective speed xerographic printing.

What is claimed is:

1. In a facsimile transceiver which is selectively operable in a transmit mode for scanning of subject copy and in a receive mode for printing at any one of several different rates on a xerographic photoreceptor, the combination comprising a laser for supplying a beam of substantially collimated light of a predetermined cross-sectional area, an optical path for said light beam, and a filtering means for adjustably attenuating said light beam to provide a substantially unattenuated light beam for scanning while said transceiver is operating in the transmit mode and an attenuated light beam having a power level per unit area on said photoreceptor within a predetermined range while said transceiver is operating in its receive mode, said filtering means including a rotatable member with a predetermined axis of rotation, a plurality of filter holders mounted on said member at a predetermined radial distance from said axis and at spaced angular intervals about said axis, a plurality of filter elements each having an area of substantially uniform optical density larger than the cross-sectional area of said light beam, each of said filter elements having a different optical density and mounted on a respective one of said holders, one of said elements being substantially transparent, and drive means for selectively indexing said member to bring a respective one of said filter elements into alignment with said optical path for each of said printing rates when said transceiver is operating in its receive mode and said substantially transparent filter element into alignment with said optical path when said transceiver is operating in its transmit mode.

2. The combination according to claim 1 wherein said drive means comprises motor means coupled to a first side of said rotatable member, multi-position rotary switch means coupled to the second side of said rotatable member, and means for resiliently mounting at least one of said motor means and said switch means to protect said motor means and said switch means from being overstressed.

* * * * *